Patented Dec. 8, 1925.

1,565,073

UNITED STATES PATENT OFFICE.

FRANK E. ELMORE, OF BOXMOOR, ENGLAND, ASSIGNOR TO NIELS C. CHRISTENSEN, OF SALT LAKE CITY, UTAH.

TREATMENT OF ARGENTIFEROUS SULPHIDE ORES.

No Drawing.  Application filed June 9, 1922. Serial No. 567,203.

*To all whom it may concern:*

Be it known that I, FRANK EDWARD ELMORE, a subject of the King of Great Britain, residing in Boxmoor, England, have invented certain new and useful Improvements in the Treatment of Argentiferous Sulphide Ores, of which the following is a specification.

This invention relates to improvements in the treatment of argentiferous sulphide ores, concentrates and the like (hereinafter called "ores") for the separation and recovery of the silver and other metals contained therein.

A known process (hereinafter called "the acid brine process") for the separation of lead and zinc from ores in which these metals co-exist in the form of sulphides, which process consists in treating the finely divided ore with a hot strong solution of sodium chloride to which a sufficient quantity of sulphuric or hydrochloric acid or an alkali bisulphate is added, whereby the lead is caused to pass into solution whilst substantially the whole of the zinc sulphide remains undissolved, the hot solution obtained being separated from the residue containing the undissolved zinc sulphide and cooled to cause a partial crystallization of the lead salt.

Ores suitable for treatment by the aforesaid process frequently contain appreciable proportions of silver, the efficient recovery of which by hitherto known methods of extraction is attended with difficulties. On treatment of the ore with acid brine only a portion of the silver passes into solution along with the lead. This portion may be recovered by known methods, but the balance remains undissolved with the zinc sulphide in the residue. The object of the present invention is to provide a satisfactory method of separating and recovering in form suitable for metallurgical treatment substantially the whole of the silver and also, if desired, the lead and zinc contained in such ores. In certain cases the ore may be poor in lead and zinc and yet rich enough in silver to be worth treatment for the recovery of this metal alone.

According to this invention the ore is first heated to about a dull heat under such conditions that the zinc sulphide remains substantially un-decomposed, and is then subjected to the acid brine process. There is thus obtained an argentiferous residue which is now leached by means of suitable solvents. The silver passing into solution is recovered by known methods; the lead may also be recovered by known methods and the desilverized zinc sulphide may be subjected to metallurigcal treatment as desired.

The suitable solvents aforesaid consist of hot, strong solutions of sodium chloride, calcium chloride or magnesium chloride containing relatively small proportions of acid chloride. By the term acid chloride as hereinafter used in the specification and claims I intend to include hydrogen chloride, a metallic chloride which gives an acid solution with water, and such metallic chloride associated with hydrogen chloride. I prefer to use a saturated solution of sodium chloride or a solution containing approximately 35 per cent by weight of calcium chloride or magnesium chloride, to which has been added a small percentage (varying with the composition of the material to be leached) of cupric chloride, hydrochloric acid, or both.

The following example illustrates the invention:—

An argentiferous lead-zinc ore from Burmah is heated in a closed pot to 650° C. for 1 hour. After cooling and, if necessary, grinding, it is treated by the acid brine process, that is to say, 20 kilos of the ore which has been thus heated, crushed to pass through a 100 mesh standard sieve, are stirred in an earthenware steam-heated vessel with 100 litres of a saturated solution of common salt and the mixture is heated to about 85° C. 6 litres of sulphuric acid of 1.84 specific gravity are gradually run into the vessel, the heating being continued. When the evolution of sulphuretted hydrogen has practically ceased, the hot brine is separated from the insoluble matter. The latter contains zinc sulphide and some of the silver, the rest of the silver and the bulk of the lead having been removed in the brine to be recovered in known manner. The argentiferous residue containing zinc sulphide is then treated with a solvent consisting of a hot, strong solution of calcium chloride containing about 35 per cent of $CaCl_2$ and about 5 per cent of cupric chloride, whereby substantially all the silver is extracted from the residue; thus a residue containing 8.25 ounces of silver per ton, when leached with the calcium chloride-cupric chloride solvent, yielded 94 per cent of the silver to the latter.

In another example an ore containing 21.9 ounces of silver per ton was heated to 450° C. for 45 minutes and then treated by the acid brine process in similar manner to that described in the foregoing example; the residue was leached at 95°–100° C. for half an hour with a solution containing 35 per cent of calcium chloride and about 5 per cent of commercial concentrated hydrochloric acid; and the final zinciferous residue was found to contain less than 5 per cent of the silver originally present in the ore.

Having thus described the nature of the said invention and the best means I know of carrying the same into practical effect, I claim:—

1. Process of treating argentiferous lead-zinc sulphide ores, consisting in heating the ore to about a dull red heat under such conditions that the zinc sulphide remains substantially undecomposed, then subjecting the ore which has been thus heated to the acid brine process, and then leaching the argentiferous zinc sulphide residue thus obtained by means of acid chloride brine solvents which extract the silver therefrom and leave the zinc sulphide substantially undissolved.

2. Process of treating argentiferous lead-zinc sulphide ores, consisting in heating the ore to about a dull red heat under such conditions that the zinc sulphide remains substantially undecomposed, then subjecting the ore which has been thus heated to the acid brine process and then leaching the argentiferous zinc sulphide residue thus obtained by means of a solution of alkaline-earth chloride containing acid chloride, which extracts the silver therefrom and leaves the zinc sulphide substantially undissolved.

3. Process of treating argentiferous lead-zinc sulphide ores, consisting in heating the ore to about a dull red heat under such conditions that the zinc sulphide remains substantially undecomposed, then subjecting the ore which has been thus heated to the acid brine process and then leaching the argentiferous zinc sulphide residue thus obtained by means of a solution of alkaline-earth chloride containing hydrogen chloride, which extracts the silver therefrom and leaves the zinc sulphide substantially undissolved.

In testimony whereof I have signed my name to this specification.

FRANK E. ELMORE.